US011789991B2

(12) United States Patent
Lecue et al.

(10) Patent No.: US 11,789,991 B2
(45) Date of Patent: Oct. 17, 2023

(54) COMPOUND DISCOVERY VIA INFORMATION DIVERGENCE WITH KNOWLEDGE GRAPHS

(71) Applicant: Accenture Global Solutions Limited, Dublin (IE)

(72) Inventors: Freddy Lecue, Dublin (IE); Chahrazed Bouhini, Dublin (IE); Jeremiah Hayes, Dublin (IE); Mykhaylo Zayats, Dublin (IE); Nicholas McCarthy, Dublin (IE); Qurrat Ul Ain, Dublin (IE)

(73) Assignee: Accenture Global Solutions Limited, Dublin (IE)

( * ) Notice: Subject to any disclaimer, the term of this patent is extended or adjusted under 35 U.S.C. 154(b) by 1303 days.

(21) Appl. No.: 16/256,424

(22) Filed: Jan. 24, 2019

(65) Prior Publication Data
US 2020/0242484 A1 Jul. 30, 2020

(51) Int. Cl.
*G06N 5/02* (2023.01)
*G06F 16/36* (2019.01)
*G06F 17/11* (2006.01)
*G06F 16/2457* (2019.01)
*G06F 18/22* (2023.01)
*G06F 18/213* (2023.01)

(52) U.S. Cl.
CPC .......... *G06F 16/36* (2019.01); *G06F 16/2457* (2019.01); *G06F 17/11* (2013.01); *G06F 18/213* (2023.01); *G06F 18/22* (2023.01); *G06N 5/02* (2013.01)

(58) Field of Classification Search
CPC ............. G06N 5/00; G06N 5/02; G06N 5/022
USPC ...................................... 706/45, 46
See application file for complete search history.

(56) References Cited

U.S. PATENT DOCUMENTS

2018/0260750 A1 9/2018 Varshney et al.

OTHER PUBLICATIONS

Balog et al. "Query Modeling for Entity Search Based on Terms, Categories, and Examples", 2011, ACM Transactions on Information Systems, vol. 29, No. 4, Article 22.*
Tsitsulin et al. "Verse: Versatile Graph Embeddings from Similarity Measures", Apr. 2018, WWW '18: Proceedings of the 2018 World Wide Web Conference.*
Hamilton et al. "Embedding Logical Queries on Knowledge Graph", Dec. 2018, NIPS'18: Proceedings of the 32nd International Conference on Neural Information Processing Systems.*

* cited by examiner

*Primary Examiner* — Jue Louie
(74) *Attorney, Agent, or Firm* — Crowell & Moring LLP

(57) ABSTRACT

Complex computer system architectures are described for utilizing a knowledge data graph comprised of elements, and selecting a discovery element to replace an existing element of a formulation depicted in the knowledge data graph. The substitution process takes advantage of the knowledge data graph structure to improve the computing capabilities of a computing device executing a substitution calculation by translating the knowledge data graph into an embedding space, and determining a discovery element from within the embedding space.

19 Claims, 5 Drawing Sheets

COMPOUND DISCOVERY VIA INFORMATION DIVERGENCE WITH KNOWLEDGE GRAPHS

TECHNICAL FIELD

Complex computer system architectures are described for utilizing a knowledge graph comprised of data elements, and selecting a new element to replace an existing element, or to add without replacing an existing element, of a formulation depicted in the knowledge graph. This discovery process takes advantage of the knowledge graph structure to improve the computing capabilities of a device executing a discovery calculation by translating the knowledge graph into an embedding space, and determining a new element from within the embedding space.

BACKGROUND

Traditional approaches for searching enterprise data typically entail using string matching mechanisms. However, such previous approaches are limited in their ability to provide queried data. Moreover, most of the data stored within an enterprise is dark, meaning is it not easily searchable or available for analytics. Accordingly, conventional knowledge query systems return results that do not provide a complete picture of knowledge and data available in the enterprise, requiring extra consumption of computing resources as knowledge queries are repeated and return inaccurate or incomplete results.

Data may be stored in different data stores depending on factors including data structure, volatility, volume, or other measurable attribute. These data stores may be designed, managed, and operated by different units within an enterprise organization. It follows that such data stores in practice behave as data silos which are disparate, isolated, and make data less accessible across the units. More transparent and open data storage solutions are desired by enterprise organizations to more efficiently and effectively share and access its information amongst their different units.

DETAILED DESCRIPTION

Figure 1:
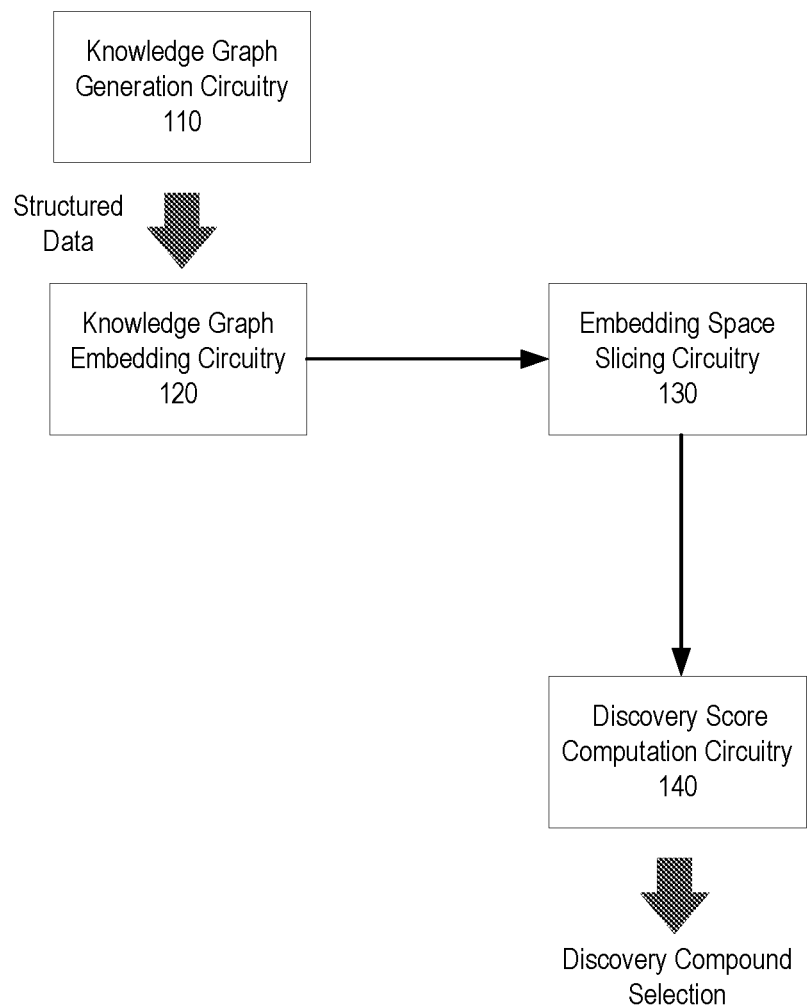
FIG. 1 shows an exemplary block diagram representation of a knowledge graph system for implementing a discovery process, according to some embodiments.

To take advantage of the benefits offered by big data technologies, enterprise systems have access to large, and rapidly growing, volumes of information, both proprietary and public. Existing analytical applications and data warehousing systems have not been able to fully utilize this profound access to information. Oftentimes information is simply aggregated into large data lakes or data warehouses without the inclusion of an added layer of relationship data connecting the information. Such aggregation of large amounts of data without contextual or relational information are data dumps that are not particularly useful. Information stored in data lakes and data warehouses are likely to be stored in their original format, thus expending large amounts of computing resources to extract, transform, and load (ETL) the information into a searchable data set to respond to a data query.

To address these technical problems, a knowledge graph is disclosed that offers an innovative data structure for presenting relevant information in response to a data query, as well as relationship information between the relevant information. The knowledge graph includes a knowledge base of relevant information structured in a graph presentation that captures entities (i.e., nodes), relationships (i.e., edges), and attributes (i.e., node properties or edge properties) with semantic meaning. This graph data structure model offered by the knowledge graph provides the semantic meaning of the included data, by modeling data with an ontology or taxonomy. Accordingly, technical improvements are realized when a computing device structures information into knowledge graphs and runs search queries on the knowledge graphs, which specifically result in the retrieval of more relevant and accurate information, in a shorter amount of time.

The present disclosure further utilizes the enhanced level of structured data offered by knowledge graphs, to identify new and useful combinations of information extracted from the existing information stored in the knowledge graphs. In the described embodiments, the combinations of information relate to combinations of ingredients that comprise compounds in a formulation represented by the knowledge graph. Furthermore, the new and useful formulations are generated by selecting a new discovery compound to either replace an existing compound in a formulation or add as a new compound in the formulation. To accomplish these results, embedding and slicing techniques are disclosed for translating the knowledge graph to a plot of nodes within an embedding space, selecting a region of interest within the embedding space, filtering nodes within the region of interest to be candidate nodes for consideration as a new discovery node, and selecting a candidate node to be the new discovery node based on a set of grading criteria analyzed on the candidate nodes within the embedding space. The discovery node is representative of a compound that will either replace an existing compound of the formulation or be added as a new compound to the formulation, thus resulting in a new recipe combination of compounds. The discovery compound may be selected to represent a new recipe formulation that is not obvious and would not have otherwise been considered, but still satisfies a set of desired compound attributes.

The features described herein are applicable to knowledge graphs of data across various fields of technology or interest. For instance, the knowledge graphs may represent information within, for example, food recipe data or pharmaceutical formulation data. In examples of the knowledge graph representing food recipe data, the nodes described in the embedding space may correspond to ingredients and compounds that comprise a recipe formulation included in the knowledge graph. Similarly, in examples of the knowledge graph representing pharmaceutical formulations, the nodes described in the embedding space may correspond to compounds that comprise a pharmaceutical formulation included in the knowledge graph.

According to the exemplary embodiments described herein, the knowledge graphs are described to represent food recipes, where the knowledge graph system is configured to identify a discovery candidate compound. The knowledge graph system may be guided by referencing queried inputs received from a user, where the queried inputs describe one or more desired attributes to be satisfied by the discovery compound. By updating the existing formulation to include the new discovery compound, the knowledge graph system is configured to discover new recipes of formulations that may not have been created otherwise. According to some embodiments, the new recipes may substitute out a compound with a similar compound, or add a new compound to an existing recipe without removing existing compounds. However, according to the embodiments described in more detail herein, the discovery compound may be an unexpected compound that otherwise may not have been considered for inclusion in the formulation recipe. Even so, the newly created formulation recipe with the new discovery compound will still satisfying desired compound attributes that are outlined prior to the implementation of the discovery process. This way, the discovery process is able to discover new and unexpected recipes that otherwise may not have been considered.

FIG. 1 illustrates an exemplary block diagram of a knowledge graph system (KG system) 100 for identifying a discovery compound by transforming a knowledge graph into an embedding space, applying analysis within the embedding space to filter through candidate nodes (i.e., nodes representing recipes, ingredients, compounds, olfactory percepts, or other formulaic attributes that may be linked via a defined relationship), and selecting a discovery node (i.e., the selected node represents the selected discovery compound) based on a grading score of the analysis. The circuitry described herein may include the hardware, software, middleware, application program interfaces (APIs), and/or other components for implementing the corresponding features of the circuitry.

Figure 3:
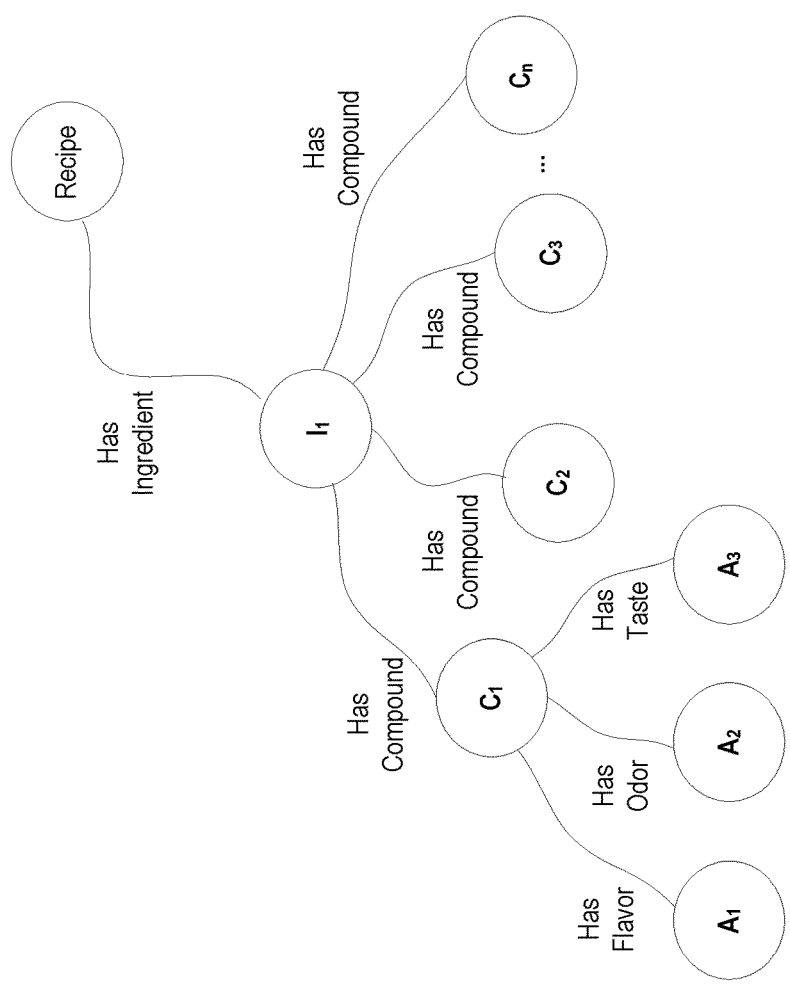
FIG. 3 shows an exemplary knowledge graph, according to some embodiments.

Initially, a knowledge graph generation circuitry 110 constructs a knowledge graph from received information. Constructing a knowledge graph may include at least two steps. First, a graph schema definition is obtained for the knowledge graph and refinement is applied as the knowledge graph is being generated. This defines the types of vertices and edges that are generated into the knowledge graph. Second, the knowledge graph is populated with data points by ingesting knowledge from one or more data sources, and applying one or more knowledge extraction techniques (e.g., named entity recognition (NER) or other natural language processing (NLP) techniques, schema mapping with relational databases, segmentation and scene analysis using computer vision, or the like), to create the vertices and edges in the knowledge graph. Each data source may create its own data processing pipeline for extracting data to include into the knowledge graph being constructed. The resulting knowledge graph provides a specific format of structured data where each node includes information, and each connecting edge represents a relationship between nodes. For example, FIG. 3 shows an exemplary knowledge graph 300 including information pertaining to known recipes, where each node includes information and each edge represents a relationship between the information included in the nodes.

Figure 4:
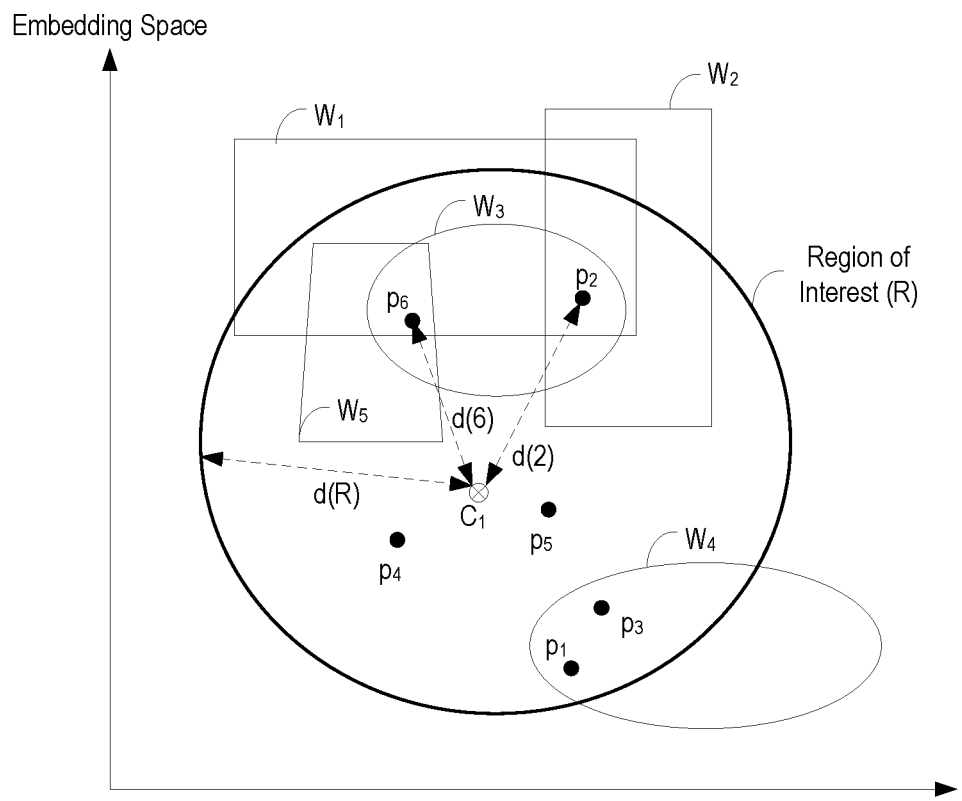
FIG. 4 shows an exemplary embedding space translation calculated for a knowledge graph, according to some embodiments.

According to the KG system 100, the structured data from the knowledge graph is received by a knowledge graph embedding circuitry 120. The knowledge graph embedding circuitry 120 is configured to convert the knowledge graph into an embedding space. For example, the knowledge graph embedding circuitry 120 may calculate the embedding space by applying a neural network architecture, used when calculating an embedding space for a large set of interrelated data such as the knowledge graph. FIG. 4 shows an exemplary embedding space 400 which includes nodes (e.g., set of triplets) and vector distances between different nodes representing the structured information included in the knowledge graph 300 shown in FIG. 3.

The KG system 100 further includes an embedding space slicing circuitry 130 for selecting a region of interest within the embedding space. The embedding space slicing circuitry 130 may initially receive query inputs that identify a formulation and a compound within the formulation that is desired to be replaced. The query inputs may further include desired compound attributes for the discovery node that will replace, or be added in view of, the selected compound in the formulation. The embedding space slicing circuitry 130 may then apply "slicing" protocols to slice the embedding space into smaller more distinct regions that include nodes that satisfy one or more slicing criteria relating to the desired compound attributes. The slicing criteria applied by the embedding space slicing circuitry 130 may include an embedding similarity calculation, a weighted look up calculation, and/or an information divergence calculation, among other possible slicing criteria that may be applied to filter down the number of nodes within the embedding space that serve as discovery candidates. Each of the embedding similarity calculation, the weighted look up calculation, and/or the information divergence calculation may result in the embedding space slicing circuitry 130 calculating a respective score. For example, the embedding space slicing circuitry 130 may calculate a similarity score, a weighted look up score, and/or an information divergence score for each of the discovery candidate nodes in view of the selected compound from the formulation.

The KG system 100 further includes discovery score computation circuitry 140 for computing an aggregate score for one or more discovery candidate nodes that were filtered down by the embedding space slicing circuitry 130. After the substitution scores are computed for the discovery candidate nodes, a node having the highest substitution score may be selected, and the compound represented by the selected node may be selected to be the discovery compound that will either replace the selected compound or be added to the formulation.

By including the discovery node as described herein, a new and oftentimes unexpected formulation may be created while still satisfying desired compound attributes. Furthermore, the utilization of the knowledge graph representation of formulations provides a more efficient data structure to allow for the discovery process to be implemented within the embedding space. Overall, executing the discovery process within the embedding space provides improvements to the computing capabilities of a computer device executing the discovery process by reducing the embedded search space and by allowing for more efficient data analysis to analyze large amounts of data in a shorter amount of time.

Figure 2:
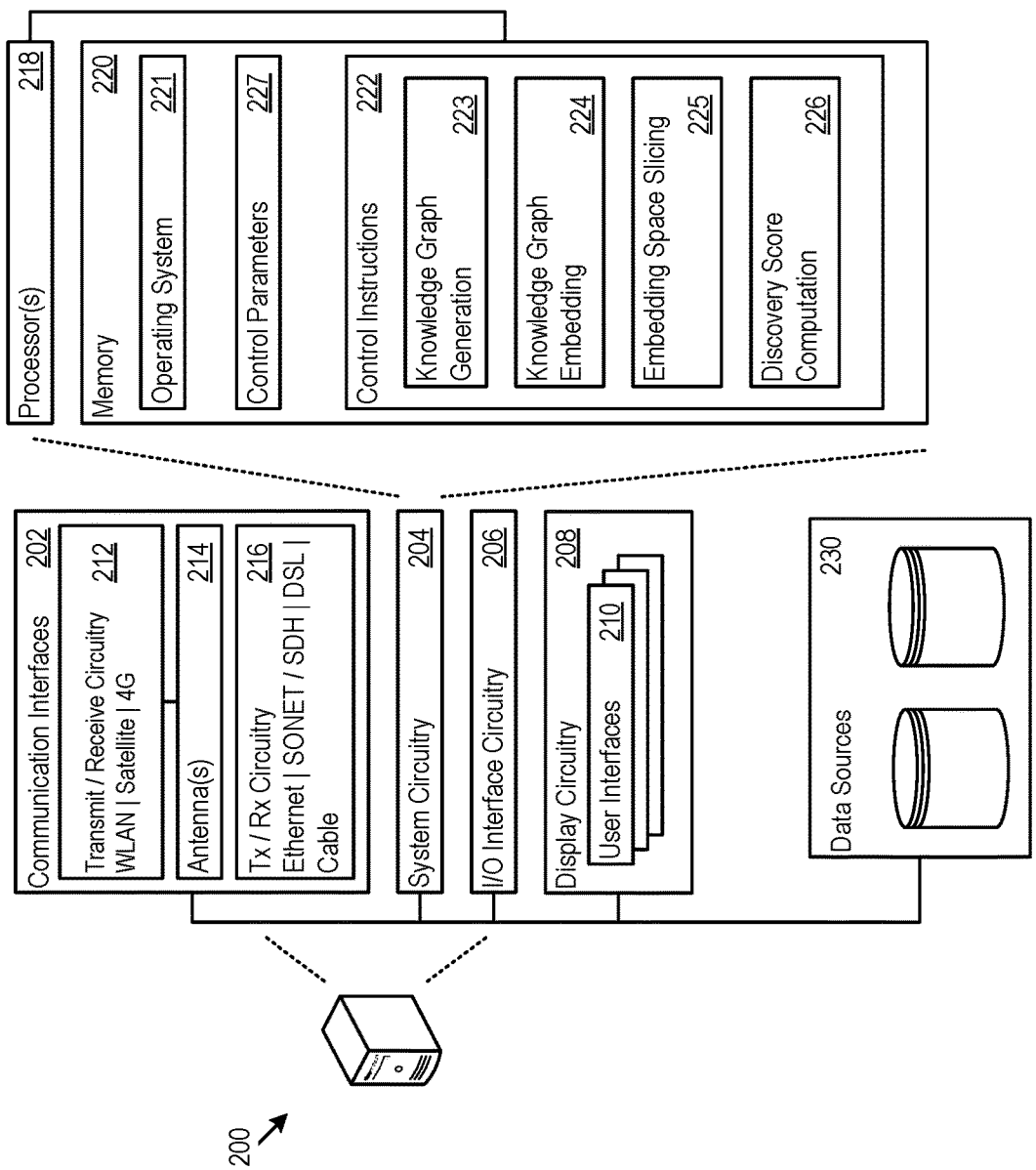
FIG. 2 shows an exemplary computer architecture for a computer device, according to some embodiments.

FIG. 2 illustrates an exemplary computer architecture of a computer device 200 on which the features of the KG system 100 may be executed. The computer device 200 includes communication interfaces 202, system circuitry 204, input/output (I/O) interface circuitry 206, and display circuitry 208. The graphical user interfaces (GUIs) 210 displayed by the display circuitry 208 may be representative of GUIs generated by the KG system 100 to present a query to an enterprise application or end user, requesting information on a compound to be replace and/or compound attributes desired to be satisfied by a candidate discovery compound. The graphical user interfaces (GUIs) 210 displayed by the display circuitry 208 may also be representative of GUIs generated by the KG system 100 to receive query inputs identifying the compound to be replace and/or compound attributes desired to be satisfied by a candidate discovery compound. The GUIs 210 may be displayed locally using the display circuitry 208, or for remote visualization, e.g., as HTML, JavaScript, audio, and video output for a web browser running on a local or remote machine. Among other interface features, the GUIs 210 may further render displays of any new formulations resulting from the replacement of compounds(s) with discovery compound(s) selected from the processes described herein.

The GUIs 210 and the I/O interface circuitry 206 may include touch sensitive displays, voice or facial recognition inputs, buttons, switches, speakers and other user interface elements. Additional examples of the I/O interface circuitry 206 includes microphones, video and still image cameras, headset and microphone input/output jacks, Universal Serial Bus (USB) connectors, memory card slots, and other types of inputs. The I/O interface circuitry 206 may further include magnetic or optical media interfaces (e.g., a CDROM or DVD drive), serial and parallel bus interfaces, and keyboard and mouse interfaces.

The communication interfaces 202 may include wireless transmitters and receivers ("transceivers") 212 and any antennas 214 used by the transmit and receive circuitry of the transceivers 212. The transceivers 212 and antennas 214 may support WiFi network communications, for instance, under any version of IEEE 802.11, e.g., 802.11n or 802.11ac, or other wireless protocols such as Bluetooth, Wi-Fi, WLAN, cellular (4G, LTE/A). The communication interfaces 202 may also include serial interfaces, such as universal serial bus (USB), serial ATA, IEEE 1394, lighting port, $I^2C$, slimBus, or other serial interfaces. The communication interfaces 202 may also include wireline transceivers 216 to support wired communication protocols. The wireline transceivers 216 may provide physical layer interfaces for any of a wide range of communication protocols, such as any type of Ethernet, Gigabit Ethernet, optical networking protocols, data over cable service interface specification (DOCSIS), digital subscriber line (DSL), Synchronous Optical Network (SONET), or other protocol.

The system circuitry 204 may include any combination of hardware, software, firmware, APIs, and/or other circuitry. The system circuitry 204 may be implemented, for example, with one or more systems on a chip (SoC), application specific integrated circuits (ASIC), microprocessors, discrete analog and digital circuits, and other circuitry. The system circuitry 204 may implement any desired functionality of the KG system 100. As just one example, the system circuitry 204 may include one or more instruction processor 218 and memory 220.

The memory 220 stores, for example, control instructions 222 for executing the features of the KG system 100, as well as an operating system 221. In one implementation, the processor 218 executes the control instructions 222 and the operating system 221 to carry out any desired functionality for the KG system 100, including those attributed to knowledge graph generation 223 (e.g., relating to knowledge graph generation circuitry 110), knowledge graph embedding 224 (e.g., relating to knowledge graph embedding circuitry 120), embedding space slicing 225 (e.g., relating to embedding space slicing circuitry 130), and/or discovery score computation 226 (e.g., relating to discovery score computation circuitry 140). The control parameters 227 provide and specify configuration and operating options for the control instructions 222, operating system 221, and other functionality of the computer device 200.

The computer device 200 may further include various data sources 230. Each of the databases that are included in the data sources 230 may be accessed by the KG system 100 to obtain data for consideration during any one or more of the processes described herein. For example, the knowledge graph generation circuitry 110 may access the data sources 230 to obtain the information for generating the knowledge graph 300.

Figure 5:
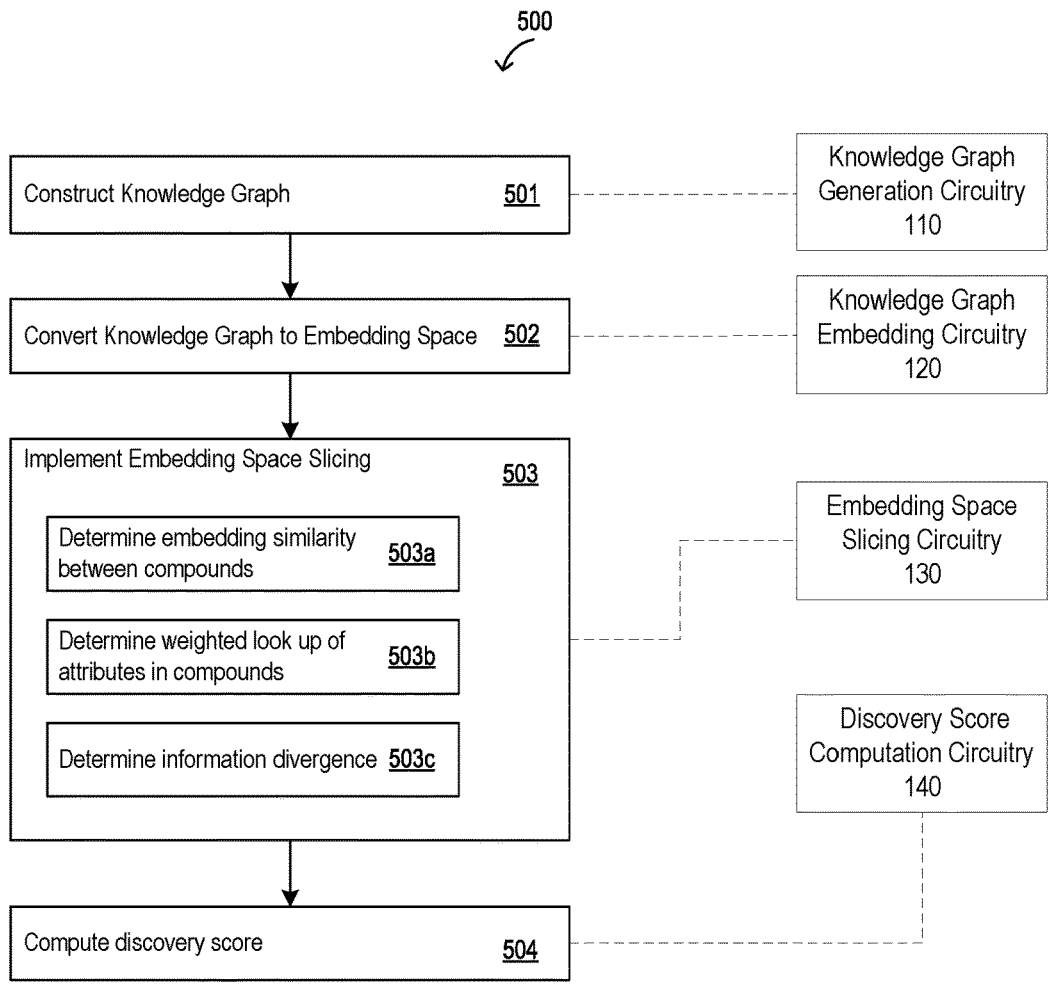
FIG. 5 shows a flow diagram for a discovery process, according to some embodiments.

FIG. 5 shows a flow diagram 500 of logic representing processes implemented by the KG system 100. The processes may be implemented by a computing device, system, and/or circuitry components as described.

The knowledge graph generation circuitry 110 constructs a knowledge graph based on received information (501). The knowledge graph includes nodes of information, and connecting edges representing a relationship between nodes at a head end of the edge and a tail end of the edge. FIG. 3 shows an exemplary knowledge graph 300 including structured data within a scope of known food recipes.

The knowledge graph embedding circuitry 120 receives the knowledge graph 300, and converts it into an embedding space (502). The conversion may include first converting the structured data from the knowledge graph 300 and converting them into a specific data format such as sets of vector triples. An exemplary vector triple may include the following format: <head entity, relationship, tail entity> (e.g., <tiramisu, has Category, dessert>). The vector triples conversion may be applied across the knowledge graph 300. The knowledge graph embedding circuitry 120 further implements the embedding space conversion by modeling the vector triples according to an elaboration of a neural network architecture to learn the representations of the knowledge graph 300. This way, the embedding space is constructed to be comprised of nodes (e.g., embedding vectors) representing the structured data comprising the knowledge graph 300, as shown by the embedding space 400 in FIG. 4. For example, the nodes (P) depicted in the embedding space 400 may correspond to compounds that relate to the ingredients of a recipe included in the knowledge graph 300.

The embedding space slicing circuitry 130 implements an embedding space slicing process (503). To begin, the embedding space slicing circuitry 130 may initially receive query inputs that identify a formulation and a compound (i.e., the selected compound) within the formulation that is being analyzed. The query inputs may further include desired compound attributes for the new discovery node that will be determined for inclusion into the formulation.

Then, the embedding space slicing process may include one or more steps for further filtering down the number of nodes to consider as discovery candidate nodes within the embedding space. For example, the embedding space slicing circuitry 130 may determine an embedding similarity between compounds (503a), determine a weighted look up of attributes in compounds (503b), and determine information divergence between discovery candidate nodes and the selected compound (503c).

Determining the embedding similarity (503a), includes determining a first set of nodes within the embedding space that represent compounds satisfying a threshold level of similarity with the selected compound. In FIG. 4, the selected compound is represented by the selected node $C_1$. To determine the region of interest R, the embedding space slicing circuitry 130 extends a distance of d(R) from the selected node $C_1$, and defines the region of interest R as including all nodes that are within the predetermined vector distance d(R) from the selected node $C_1$. Slicing the embedding space into the smaller region of interest R may significantly reduce a number of discovery candidate nodes that are being considered. According to the exemplary embedding space 400 shown in FIG. 4, the region of interest R is shown to include nodes $p_1$ to $p_6$. The predetermined vector distance d(R) may be received via user input, set by default, and/or revised by a system administrator having the proper level of authority. Each node within the region of interest R may be assigned an embedding similarity score that is representative of its respective vector distance from the selected node $C_1$. A calculation for similarity between any two nodes in an embedding space includes a cosine similarity metric. Euclidean distance (although not strictly a similarity metric) could also be used.

The embedding space slicing circuitry 130 may further partition the embedding space to identify specific compound attribute regions, where nodes within an attribute region are understood to represent compounds that satisfy the corresponding attribute. For example, the embedding space 400 shown in FIG. 4 includes a first attribute region $w_1$, a second attribute region $w_2$, a third attribute region $w_3$, a fourth attribute region $w_4$, and a fifth attribute region $w_5$. Each of the attribute regions $w_1$-$w_5$ corresponds to a compound attribute relating to, for example, taste, flavor, odor, or texture (e.g., milky flavor, smooth texture, minty odor, sweet taste). In addition, each of the attribute regions $w_1$-$w_5$ may correspond to either a positive constraint or a negative constraint, as defined by the list of desired compound attributes received by the query inputs. A positive constraint may be weighted positively (e.g., +1), whereas a negative constraint may be weighted negatively (e.g., −1), during a weighted scoring computation. According to the embodiments portrayed by embedding space 400, attribute regions $w_1$-$w_3$ represent positive constraints, whereas attribute regions $w_4$-$w_5$ represent negative constraints.

Determining the weighted look up of attributes in compounds (503b), includes computing a weighted look up score to further slice the embedding space and the number of discovery candidate nodes being considered. To compute the weighted look up score from the nodes included in the region of interest, the embedding space slicing circuitry 130 creates a constraint matrix comprised of the following:

$$v(\text{nodes}) \sum_{w_i} w_i \mid \text{for all nodes within the Region of Interest } R$$

E.g., for node $p_2$, $v(p_2)=w_1+w_2+w_3=3$
E.g., for node $p_6$, $v(p_6)=w_1+w_3-w_5=1$ Computing the weighted look up score may further take into account a node's distance (which is the representative vector distance) from the selected node $C_1$. The embedding space slicing circuitry 130 may select a predetermined subset slice of nodes for further consideration in a next slicing step.

The embedding space slicing circuitry 130 may further partition the embedding space to identify specific compound attribute regions, where nodes within an attribute region are understood to represent compounds that satisfy the corresponding attribute. For example, an information divergence score may be determined by the embedding space slicing circuitry 130 for discovery candidate nodes selected from the previous weighted look up scoring process (503c). The information divergence score is a representation of a level of divergence a candidate compound is calculated to have with the selected compound. For instance, a high divergence score indicates a compound's high level of divergence from the selected compound (more different), while a lower divergence score indicates a low level of divergence from the selected compound (more similar).

The information divergence score may be obtained by the following process:

Step 1: all ingredients from the knowledge graph which contain the selected compound are identified. Within the embedding space, this is accomplished by identifying ingredients including the selected node $C_1$.

Step 2: for each ingredient that contains the selected compound, a link prediction is computed for the selected compound. For example, the link prediction calculates the probability of the selected compound being in an ingredient. The probability may be directly related to a composition percentage of the selected compound in the ingredient. For example, if the selected compound is alcohol and the ingredient is an orange liquor, the probability of alcohol being in the orange liquor may be correlated, in some way, to the percentage alcohol content in the orange liquor.

Step 3: for each ingredient that contains the selected compound, a link prediction is computed with each node (i.e., compound) in the region of interest R. For example, in embedding space 400 the region of interest R is shown to include nodes $p_1$ to $p_6$, so the link prediction computes a probability of each compound represented by the nodes $p_1$ to $p_6$ to be included in the ingredients identified to include the selected compound.

Step 4: a Kullback-Leibler (KL) divergence score is calculated between each pair generated at step 2 and step 3.

Step 5: an information divergence score is computed by aggregating the KL divergence scores from step 4 for each compound in the region of interest R $\{p_1$ to $p_6\}$.

$$ID(p_i) = \sum_j LP(C_1) \log_2 \frac{LP(C_1)}{LP_j(p_i)}$$

Where:
ID=Information divergence
$p_i$=node representing a compound in the region of interest within the embedding space
$C_i$=selected node representing the selected compound being considered
j=all ingredients
LP=link prediction probability Following the embedding space slicing process (503), the embedding space slicing circuitry selects a predetermined number of discovery candidate nodes having the highest information divergence score. So for each of steps involved in the embedding space slicing process (503), a number of discovery candidate nodes is filtered down and reduced.

After computing the information divergence score, the discovery score computation circuitry 140 computes a substitution score for the remaining discovery candidate nodes. The discovery score calculation may be as follows:

Substitution Score=$\alpha_i$*(embedding similarity score)+$\beta_i$*(weighted look up score)+$\gamma_i$*(information divergence score)

From the calculated substitution scores, the node with the highest discovery score is selected as the discovery node, and the corresponding compound is selected as the discovery compound.

Various implementations have been specifically described. However, other implementations that include a fewer, or greater, number of features and/or components for each of the apparatuses, methods, or other embodiments described herein are also possible.

What is claimed is:

1. A system comprising:
   a knowledge graph reception circuitry configured to receive an original knowledge graph including a set of structured data;
   a knowledge graph embedding circuitry configured to convert the original knowledge graph to an embedding space comprising nodes by converting the set of structured data into sets of vector triples and modelling the vector triples with a neural network architecture to learn the representations of the knowledge graph;
   a region slicing circuitry configured to:
      identify a selected node within the embedding space;
      determine a region of interest within the embedding space containing the selected node, and calculate a similarity score for each node within the region of interest, wherein the similarity score represents a similarity between each node within the region of interest and the selected node;
      calculate a weighted look up score for nodes within the region of interest, and select a predetermined number of candidate nodes having a highest weighted look up score; and
      calculate an information divergence score for the predetermined number of candidate nodes having the highest weighted look up score, wherein the information divergence score represents a divergence of a discovery candidate node from the selected node; and
   computation circuitry configured to:
      calculate a discovery score for at least one candidate node within the predetermined number of candidate nodes having the highest weighted look up score; and
      select a discovery node from the at least one candidate node according to a respective discovery score.

2. The system of claim 1, wherein the at least one candidate node represents a compound included in a formulation.

3. The system of claim 1, wherein the region slicing circuitry is configured to identify the selected node within the embedding space based on at least part of a received user query.

4. The system of claim 1, wherein the region slicing circuitry is configured to determine the region of interest based on at least part of a received user query.

5. The system of claim 1, wherein the computation circuitry is configured to calculate the discovery score by a weighted sum of the similarity score, the weighted look up score, and the information divergence score for a respective candidate node.

6. The system of claim 1, wherein the region slicing circuitry is configured to determine the region of interest as including nodes within a predetermined vector distance from the selected node.

7. The system of claim 1, wherein the computation circuitry is configured to select a candidate node having a highest discovery score as the discovery node.

8. The system of claim 1, wherein the region slicing circuitry is configured to calculate the information divergence score by:
   determining a first link prediction probability for each node linked to the selected node based on at least part of a received user query;
   determining a second link prediction probability for each node linked to the nodes within the region of interest based on at least part of the received user query; and
   determining the information divergence score based on the first link prediction probability and the second link prediction probability.

9. The system of claim 1, wherein the region slicing circuitry is configured to calculate the information divergence score using a Kullback-Leibler (KL) divergence technique.

10. A method comprising:
    receiving, by a knowledge graph reception circuitry, an original knowledge graph including a set of structured data;
    converting, by a knowledge graph embedding circuitry, the original knowledge graph to an embedding space comprising nodes by converting the set of structured data into sets of vector triples and modelling the vector triples with a neural network architecture to learn the representations of the knowledge graph;
    identifying, by a region slicing circuitry, a selected node within the embedding space;
    determining, by the region slicing circuitry, a region of interest within the embedding space containing the selected node, and calculating a similarity score for each node within the region of interest, wherein the similarity score represents that depicts a similarity between each node within the region of interest and the selected node;
    calculating, by the region slicing circuitry, a weighted look up score for nodes within the region of interest, and selecting a predetermined number of candidate nodes having a highest weighted look up score; and
    calculating, by the region slicing circuitry, an information divergence score for the predetermined number of candidate nodes having the highest weighted look up score, wherein the information divergence score represents a divergence of a discovery candidate node from the selected node;
    calculating, by a computation circuitry, a discovery score for at least one candidate node within the predetermined number of candidate nodes having the highest weighted look up score; and
    selecting, by the computation circuitry, a discovery node from the at least one candidate node according to a respective discovery score.

11. The method of claim 10, wherein identifying, by the region slicing circuitry, the selected node within the embedding space is based on at least part of a received user query.

12. The method of claim 10, wherein determining the region of interest comprises including nodes within a predetermined vector distance from the selected node, wherein the predetermined vector distance is included in a received user query.

13. The method of claim 10, wherein calculating, by the computation circuitry, the discovery score comprises calculating a weighted sum of the similarity score, the weighted look up score, and the information divergence score for a respective candidate node.

14. The method of claim 10, wherein calculating the information divergence score comprises:
    determining a first link prediction probability for each node linked to the selected node based on at least part of a received user query;

determining a second link prediction probability for each node linked to the nodes within the region of interest based on at least part of the received user query; and determining the information divergence score based on the first link prediction probability and the second link prediction probability.

15. The method of claim 10, wherein selecting, by the computation circuitry, the discovery node comprises selecting a candidate node having a highest substitution score as the discovery node.

16. A product comprising:

a machine-readable medium, other than a transitory signal; and instructions stored on the machine-readable medium, the instructions configured to, when executed, cause processing circuitry to:

receive an original knowledge graph including a set of structured data;

convert the original knowledge graph to an embedding space comprising nodes by converting the set of structured data into sets of vector triples and modelling the vector triples with a neural network architecture to learn the representations of the knowledge graph;

identify a selected node within the embedding space for substitution;

determine a region of interest within the embedding space containing the selected node, and calculating a similarity score for each node within the region of interest wherein the similarity score represents a similarity between each node within the region of interest and the selected node;

calculate a weighted look up score for nodes within the region of interest, and selecting a predetermined number of candidate nodes having a highest weighted look up score; and calculate an information divergence score for the predetermined number of candidate nodes having the highest weighted look up score, wherein the information divergence score represents a divergence of a discovery candidate node from the selected node;

calculate a discovery score for at least one candidate node within the predetermined number of candidate nodes having the highest weighted look up score; and select a discovery node from the at least one candidate node according to a respective discovery score.

17. The product of claim 16, wherein the instructions, when executed, cause the processing circuitry to:

identify the selected node within the embedding space based on at least part of a received user query.

18. The product of claim 16, wherein the instructions, when executed, cause the processing circuitry to calculate the discovery score by a weighted sum of the similarity score, the weighted look up score, and the information divergence score for a respective substitute candidate node.

19. The product of claim 16, wherein the instructions, when executed, cause the processing circuitry to calculate the information divergence score by:

determining a first link prediction probability for each node linked to the selected node based on at least part of a received user query;

determining a second link prediction probability for each node linked to the nodes within the region of interest based on at least part of the received user query; and determining the information divergence score based on the first link prediction probability and the second link prediction probability.

\* \* \* \* \*